Dec. 8, 1936. A. PETELER 2,063,621
THERMOSTAT VALVE STRUCTURE
Filed Sept. 20, 1935 2 Sheets-Sheet 1
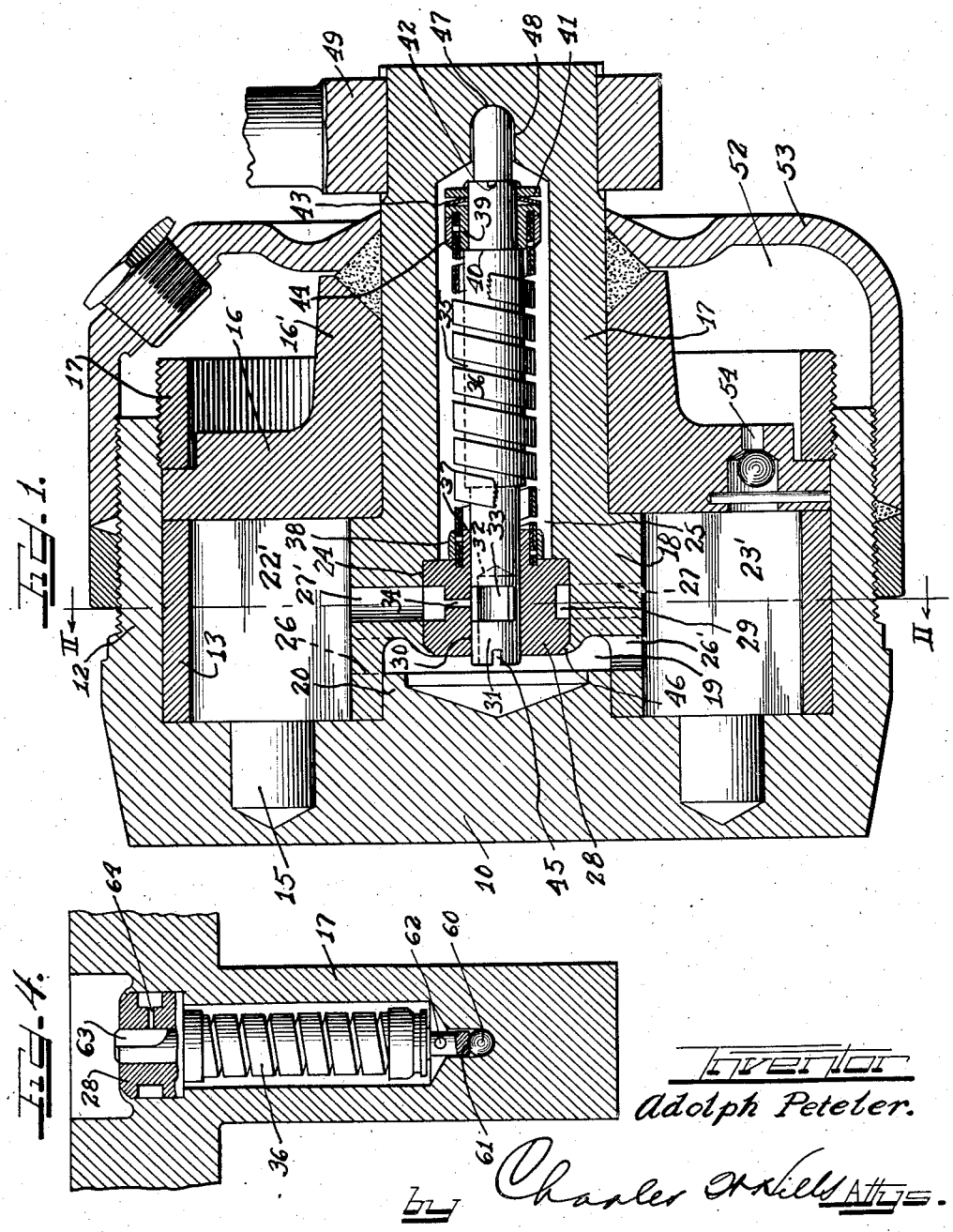

Dec. 8, 1936.   A. PETELER   2,063,621
THERMOSTAT VALVE STRUCTURE
Filed Sept. 20, 1935   2 Sheets-Sheet 2
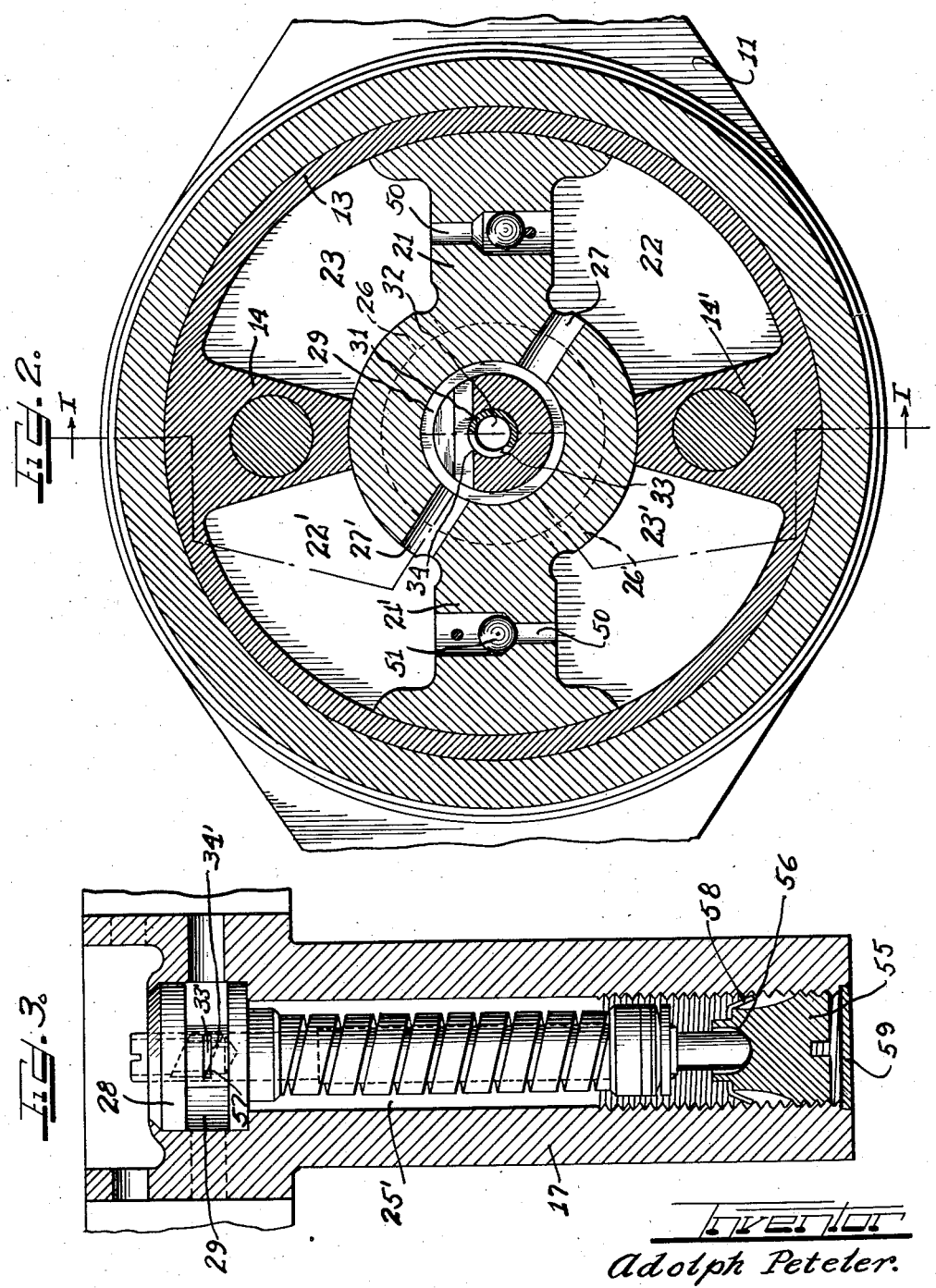
Inventor
Adolph Peteler.
by Charles W. Hills Attys.

Patented Dec. 8, 1936

2,063,621

UNITED STATES PATENT OFFICE 2,063,621

THERMOSTAT VALVE STRUCTURE

Adolph Peteler, Freeport, N. Y.

Application September 20, 1935, Serial No. 41,354

13 Claims. (Cl. 188—100)

My invention relates to thermostatic valve structure adapted particularly for use in hydraulic shock absorbers for controlling the flow of displaced hydraulic fluid.

An important object of the invention is to provide a unitary thermostat valve assembly comprising a valve element, a seat element and a thermostat element, in which assembly accurate adjustment of the valve relative to its seat may be made before the assembly is inserted into the shock absorber.

Another object is to provide an arrangement in which the pre-assembled valving structure is supported within a blind chamber within the shock absorber so that after the shock absorber leaves the factory the valving assembly will be inaccessible and non-adjustable in service, such arrangement preventing tampering with and upsetting of the accurate factory adjustment.

A further important object is to provide a valve assembly comprising a ported bushing adapted to be readily mounted in a valve chamber provided in the shock absorber, with the bushing journalling a rotary ported valve and also anchoring one end of a thermostat coil whose other end is connected with the valve.

Still another object is to provide an arrangement in which the thermostat coil and valve member have a friction connection permitting relative adjustment for accurate setting of the valve port relative to the seat member port before the valving structure is applied to a shock absorber.

A further object of the invention is to provide a modified arrangement in which the valving assembly may be adjusted at the factory before installation in a shock absorber and with means provided on the shock absorber structure, accessible from the exterior thereof, for effecting a final accurate service adjustment.

The structural details for carrying out the above referred to and other features of the invention are shown incorporated on the drawings, in which drawings Figure 1 is a diametral section of a shock absorber on plane I—I Figure 2;

Figure 2 is a section on plane II—II Figure 1;

Figure 3 is a diametral section of the shock absorber piston structure showing a modified valving arrangement; and Figure 4 is a section like Figure 3 showing another modified arrangement.

The shock absorber to which my invention is shown applied is of the type disclosed in Fox et al. Patent No. 2,004,752 dated June 11, 1935. Briefly describing the structure it comprises a cup-shaped housing body whose base 10 has ears 11 extending therefrom by means of which it may be secured to a support such as the chassis of an automotive vehicle. Seated within the annular wall 12 of the housing body is a ring 13 from which partition walls 14 and 14' extend radially inwardly, this ring structure being secured by pins 15 extending through the partition walls and into the base 10. A cover wall 16 fits into the end of the annular wall 12 and abuts against the ring 13 and the partition walls and is secured in place by an annular nut 17 threading into the wall 12.

The wall 16 with its bearing extension 16' journals the shock absorber shaft 17 whose hub portion 18 extends between the wall 16 and the base 10 and has the end recess 19 receiving the bearing lug 20 extending inwardly from the base 10. Vanes 21, 21' extend from the hub 18 and the hub and vane and the partition walls 14, 14' divide the space within the ring 13 into high pressure chambers 22, 22' and low pressure chambers 23, 23', these chambers containing hydraulic fluid.

The hub 18 has an intermediate recess or bore 24 of less diameter than the inner bore or recess 19, and the hub has also the outer bore 25 of less diameter than the bore 24 and continued through the shaft 17 to terminate short of the outer end thereof. The inner or end bore or recess 19 is connected by passages 26, 26' with the low pressure chambers 23 and 23' respectively while the intermediate bore 24 is connected by passages 27 and 27' with the high pressure working chambers 22 and 22' respectively.

The valving assembly for controlling the flow of fluid from the high pressure to the low pressure chambers comprises a cylindrical block or bushing 28 which fits into and is rigidly secured in the intermediate bore 24 of the shaft hub and which has a circumferential channel 29 for alignment with the passages 27 and 27' communicating with the high pressure working chambers. The bushing has an axially extending cylindrical bore 30 for receiving and seating the cylindrical valve 31. This valve has the bore 32 extending inwardly from its inner end which bore communicates with the recess 19 connected with the low pressure working chambers. The valve is slotted transversely on one side to form a circumferentially extending port 33 for cooperation with the port or orifice 34 in the bushing 28, this orifice being formed by transversely slitting the bushing as clearly shown in Figure 2. Upon rotational movement of the valve in the bushing its port 33 will overlap the orifice 34 to a greater or less degree to thereby regulate the fluid flow between the working chambers.

The stem or body 35 from which the valve extends is surrounded by the helical thermostat coil 36 which at its inner end receives the collar 37 on the bushing 28 to which collar the coil end is clamped by a ferrule or ring 38. The thermostat coil is thus anchored at its inner end to the valve seating bushing. At its outer end the coil is connected with the valve stem 35 so that as the thermostat coil winds or unwinds in response to temperature change the valve 31 will be turned in its seat for adjustment of its port relative to the orifice 34. In order that the valve may be manually adjusted relative to its seat I have provided a friction connection between the valve stem and the outer end of the coil. As shown a collar 39 surrounds the valve stem and abuts at its inner end against the shoulder 40 on the stem. An abutment washer 41 on the stem is held against outward displacement by suitable abutment means as for example by deflecting over portions of the stem to form abutment lugs 42. Between the abutment washer 41 and the collar 39 a spring washer 43 is inserted which exerts pressure against the collar 39 to hold it frictionally but yieldably to the stem. The outer end of the thermostat coil fits around the collar 39 and is claimped thereto by a ferrule or ring 44.

Before the valving assembly is inserted into the shock absorber shaft structure the valve is adjusted for the service it is to perform. Such adjustment is readily accomplished by holding the collar 39 to which the outer end of the thermostat coil is secured and then turning the valve and stem for adjustment of its port relative to the bushing port and such turning may be readily accomplished by means of a screw driver inserted in the slot 45 in the valve end. After such setting of the valve the valving assembly is inserted with its thermostat supporting end into the bore 25 and the seating bushing into the bore 24, the bushing being then secured against displacement as by peening the metal around the edge of the bore 24 against the outer edge of the bushing as indicated at 46. In the arrangement shown in Figure 1 the shaft bore 25 terminates short of the outer end of the shaft so as to prevent access to the valving assembly from the exterior of the shock absorber. To assist in holding the valve structure in proper alignment with the seating bushing the shaft end may be provided with a bearing recess 47 for the outer end of the valve stem. The stem end preferably abuts the outer end of the bearing recess before the seat bushing has been fully inserted into the bore 24 in order that the thermostat coil may be given a slight axial compression so as to exert sufficient spring pressure to hold the stem against the bottom of the recess 47 in which position the valve port will be maintained in proper axial alignment relative to the bushing port or orifice 34. As shown the end of the stem and the bottom of the recess 47 may be rounded and the diameter of the recess made such as to provide circumferential clearance space 48 around the stem end. With such arrangement the pivotal abutment of the stem in the recess will prevent lateral strain on the stem and permit the valve to operate freely in its seat without binding.

During operation of the shock absorber the shaft, which is connected by a lever 49 with the vehicle axle, will be oscillated to displace the fluid flows from the high pressure chambers 22 and 22' through the passages 27 and 27' into the annular channel 29 of the seat bushing 28 and from there the fluid flows through the bushing port or orifice 34 and through the valve port 33 and the valve bore 32 into the recess or chamber 19 and from there through the passages 26, 26' to the low pressure chambers 23, 23'. During compression of the vehicle springs the fluid will flow in the opposite direction through the path just traced but a lower resistance path is provided for the fluid flow during compression movement of the vehicle springs so as to lessen the shock absorber resistance. As shown in Figure 2 the piston vanes have passages 50 therethrough controlled by check valves 51, the check valves closing the passages during rebound oscillation of the piston structure but opening during movement of the piston structure in response to spring compression.

The hydraulic working chambers are replenished with hydraulic fluid from a reservoir 52 formed by a shell 53 extending between the end of the body wall 12 and the outer end of the shaft, the fluid flowing from the reservoir through check valve controlled passages 54 to the working chambers in a manner well understood in the art. As the temperature of the hydraulic fluid changes the thermostat coil will respond to adjust the valve. With increasing temperature and consequently decreasing viscosity of the fluid the overlap of the orifice 34 by the valve port will be decreased by the thermostat coil and with decreasing temperature and increase in viscosity the thermostat will adjust the valve for increased passageway through the port.

In the arrangement shown in Figure 1 the valving assembly is inaccessible from the exterior of the shock absorber and the operation of the shock absorber is dependent upon the factory adjustment of the valving assembly. With certain installations of shock absorbers it may be desirable to give the valving assemblies a final adjustment before or after the shock absorbers are installed on a vehicle. The modified arrangement shown in Figure 3 shows how such final adjustment may be accomplished. Here the shaft bore 25' extends to the exterior at the outer end of the shaft and the bore is threaded for reception of a supporting and adjusting plug 55 which has the recess 56 for pivoting the outer end of the valve stem. The valving arrangement is the same as that of Figure 1 except that the valve, instead of being slotted transversely to provide a port, is slotted on the bias so that the side wall 57' of the valve port 33' extends on the diagonal or bias relative to the circumferentially extending port 34' in the seating bushing 28. With this arrangement the valve assembly may be primarily adjusted before insertion in the shock absorber and the final adjustment will be effected by turning of the threaded plug 55. Turning of the plug for inward axial movement thereof will cause axial inward shift of the valve structure to change the overlap by the valve port of the bushing port. In the arrangement shown in Figure 3 inward shift of the valve structure will decrease the overlap and when the plug 55 is turned for outward axial movement thereof the thermostat coil, acting as a spring, will shift the valve structure axially outwardly to increase the port overlap. The arrangement is thus in the nature of a micrometer adjustment in which turning of the threaded plug 55 through a certain distance will cause only structure and therefore a very accurate final adjustment and setting of the valve may be accomplished. A spring washer 58 may be provided for frictionally locking the adjustment plug 55 in set position. If it is desired to prevent tampering with the valving mechanism after the final adjustment has been made, a closure disk 59 may be secured in the end of the shaft bore.

Figure 4 shows a simple arrangement for eliminating as much as possible any friction between the outer end of the valve stem and its guide support at the outer end of the shaft. Instead of having the stem end convex and directly engaging the concave bottom of the recess 47 as shown in Figure 1, a steel ball 60 could be seated in the concave end of the recess and the end of the stem could be flat, or slightly concave as indicated at 61, for engagement with the ball. It is evident that a similar ball thrust bearing could be provided between the valve stem and the plug 55 shown in the modified structure of Figure 3. With such frictionless bearing engagement for the outer end of the valve stem, the thermostat coil will be able to act freely for accurate adjustment of the valve portage as the temperature changes.

Instead of providing a screw slot in the inner end of the valve stem, a hole 62 could be provided in the outer end of the stem for receiving a suitable rod or tool for turning of the valve stem relative to the outer end of the thermostat coil for setting of the valve port 63 relative to the bushing port 64.

I have shown a practical and efficient embodiment of the various features of my invention but I do not desire to be limited to the exact construction, arrangement, and operation shown and described as changes and modifications are possible without departing from the scope of the invention.

I claim as follows:

1. A unitary valving assembly for hydraulic shock absorbers comprising a bushing having a cylindrical bore and having a port, a valve journalled in said bore for rotary movement therein and having a port for cooperating with the bushing port, a stem extending from said valve, and a thermostat element surrounding said stem and anchored at one end to said bushing and connected at its other end with said stem.

2. A unitary valving assembly for hydraulic shock absorbers comprising a ported bushing having an axially extending bore, a cylindrical ported valve journalled in said bore and having a stem extending therefrom, and a thermostat coil surrounding said stem, said coil being rigidly anchored at one end to said bushing and at its other end having frictional connection with said stem.

3. A unitary valving assembly for hydraulic shock absorbers comprising a bushing having an axially extending cylindrical bore and a port communicating with said bore, a cylindrical valve journalled in said bore and having a port for cooperating with the bushing port, said valve having a stem extending therefrom, a thermostat coil surrounding said stem and rigidly anchored at its inner end to said bushing, and a connection between the outer end of said coil and said stem, said connection being yieldable to permit relative rotation between said stem and coil for setting of said ports but arranged to lock said stem and coil against relative movement after adjustment of said ports.

4. A unitary valving assembly for hydraulic shock absorbers comprising a bushing having a cylindrical axial bore and a port communicating with said bore, a cylindrical valve journalled in said bore and having a port for cooperating with the bushing port, a thermostat coil surrounding said valve and rigidly anchored at its inner end to said bushing, a collar on the outer end of said valve secured to the outer end of said coil, and friction means between said collar and valve tending to resist movement of said valve relative to said collar but permitting such movement to be manually made for adjustment of the valve port relative to the bushing port.

5. A unitary valving assembly for hydraulic shock absorbers comprising a bushing having a bore and a port leading to said bore, a valve seated in said bore and having a port for cooperating with the bushing port to control the flow of fluid, a thermostat element anchored at one end to said bushing, and a friction connection between the other end of said thermostat element and said valve tending to hold said end and valve rigidly together but being yieldable for manual movement of the valve relative to the thermostat element for adjustment of the valve port relative to the bushing port.

6. A unitary valving assembly for hydraulic shock absorbers comprising a bushing having a cylindrical bore and a port leading thereto, a cylindrical valve journalled in said bore and having a cooperating port, a stem extending from said valve concentric therewith, a thermostat coil surrounding said stem and rigidly anchored at its inner end to said bushing, an abutment at the outer end of said stem and a shoulder inwardly thereof, a collar on said stem between said abutment and shoulder and secured to the outer end of said coil, and a friction washer between said abutment and collar tending to hold said stem against rotation relative to said collar but yielding for manual rotation of said stem in said collar for adjustment of the valve port relative to the bushing port.

7. A unitary valving assembly for hydraulic shock absorbers comprising a bushing having an axially extending cylindrical bore and a circumferentially extending port communicating with said bore, a cylindrical valve journalled in said bore and having a port extending diagonally for cooperating with the bushing port, a thermostat coil anchored at one end to said bushing and connected at its other end to said valve for automatically moving said valve for adjustment of its diagonal port relative to the bushing port as the temperature changes, and means for effecting axial shift of said valve for manual setting of its diagonal port relative to the bushing port.

8. A unitary valving assembly for hydraulic shock absorbers comprising a bushing having an axially extending cylindrical bore and a circumferentially extending port communicating with said bore, a cylindrical valve journalled in said bore and having a diagonally extending port for cooperating with said bushing port, said valve having a stem extending therefrom, a thermostat coil surrounding said stem and rigidly anchored at its inner end to said bushing and having connection at its outer end with said stem, said coil being responsive to temperature changes to move said stem and valve for setting of the diagonal valve port relative to the bushing port, and a threaded plug coaxial with said stem and abutting the outer end thereof whereby said stem and valve may be manually axially moved for setting of the valve port relative to the bushing port.

9. A unitary valving assembly for hydraulic shock absorbers comprising a bushing having an axially extending cylindrical bore and a circumferentially extending port communicating with said bore, a cylindrical valve journalled in said bore and having a diagonally extending port for cooperating with said bushing port, said valve having a stem extending therefrom, a thermostat coil surrounding said stem and rigidly anchored at its inner end to said bushing and having connection at its outer end with said stem, said coil being responsive to temperature changes to move said stem and valve for setting of the diagonal valve port relative to the bushing port, and a threaded plug coaxial with said stem and abutting the outer end thereof whereby said stem and valve may be manually axially moved for setting of the valve port relative to the bushing port, said plug forming a pivot support for the outer end of said stem.

10. A unitary valving assembly for hydraulic shock absorbers comprising a seat member having a cylindrical bore and having a port, a valve journaled in said bore for rotary movement therein and having a port for cooperating with the seat member port, a stem extending from said valve, a thermostat element surrounding said stem and anchored at one end to said seat member and connected at its other end with said stem, and means forming a bearing support for the outer end of said stem.

11. A unitary valving assembly for hydraulic shock absorbers comprising a seat member having a cylindrical bore and having a port, a valve journaled in said bore for rotary movement therein and having a port for cooperating with the seat member port, a stem extending from said valve, a thermostat element surrounding said stem and anchored at one end to said seat member and connected at its other end with said stem, and means forming a bearing support for the outer end of said stem, said bearing support being adjustable for effecting axial shift of said stem and valve for relative adjustment of said ports.

12. A unitary valving assembly for hydraulic shock absorbers comprising a seat member having a cylindrical bore and having a port, a valve journaled in said bore for rotary movement therein and having a port for cooperating with the seat member port, a stem extending from said valve, a thermostat element surrounding said stem and anchored at one end to said seat member and connected at its other end with said stem, means providing a pocket for receiving the outer end of said stem, and a ball bearing in said pocket for said stem.

13. A unitary valving assembly for hydraulic shock absorbers comprising a seat member having a bore and having a port, a valve journaled in said bore for rotary movement therein and having a port for cooperating with the seat member port, a stem extending from said valve, a thermostat coil surrounding said stem and anchored at one end to said seat member and connected at its outer end with said stem, and means providing a thrust bearing for the outer end of said stem, said thermostat coil acting as a spring to hold said stem in engagement with said thrust bearing.

ADOLPH PETELER.